July 24, 1956
E. J. STROHM
2,756,054
FISHING GAME
Filed Aug. 17, 1953
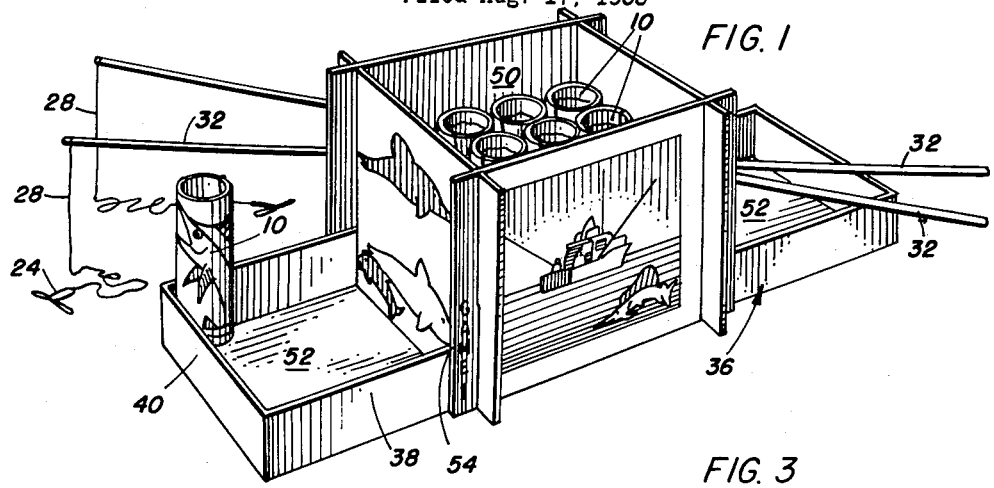
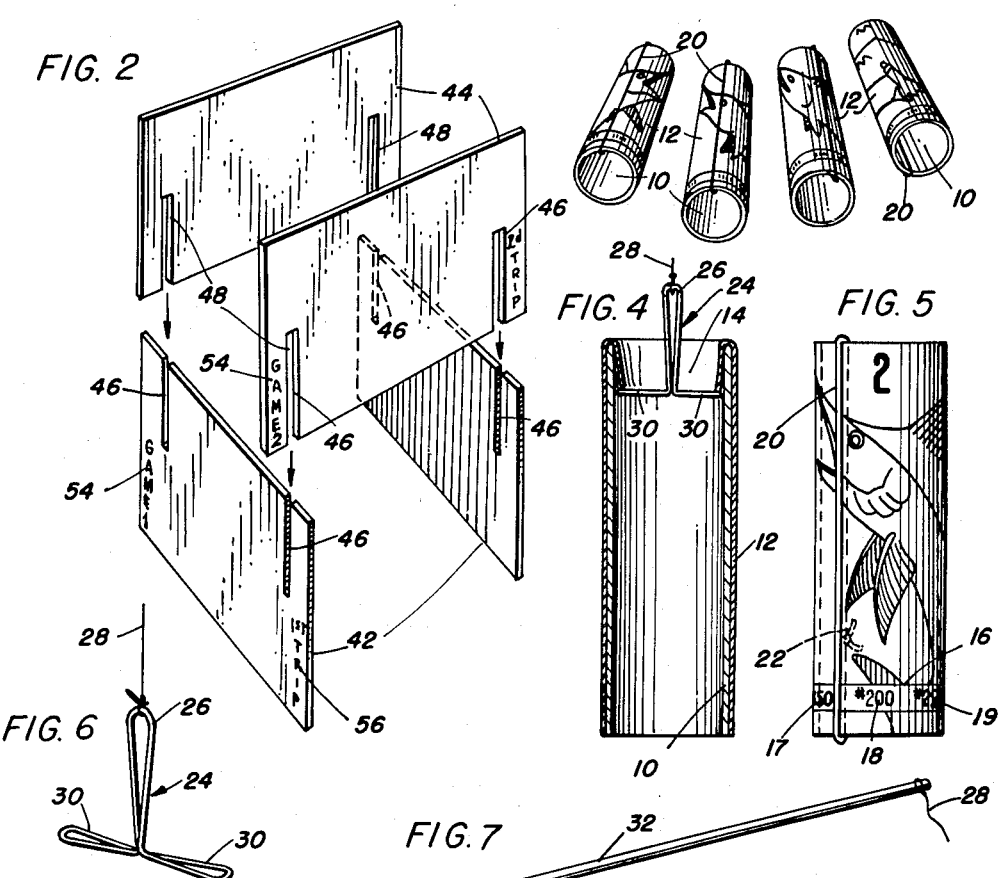
INVENTOR:
EDWARD J. STROHM
BY
ATT'Y United States Patent Office 2,756,054
Patented July 24, 1956

2,756,054
FISHING GAME
Edward J. Strohm, Chicago, Ill.
Application August 17, 1953, Serial No. 374,668
6 Claims. (Cl. 273—140)

This invention relates to a fishing game and is more particularly described as a boxed game in which a portion of the box itself is used as a part of the game.

In this game, there are a number of partitions which when taken out of the container box and placed together form a large receptacle in which the pieces designated as fish are placed and from which they may be drawn and deposited in one or more other parts of the box structure in order to qualify as fish actually caught.

Fishing games of many kinds have been proposed, but the present invention has many novel features of difference which together provide an apparatus for fishing, for scoring the results of the fishing by different people and successive trials for utilizing parts of a containing receptacle for a fish pool and for a receptacle for fish caught; for providing a hook construction which allow some fish to get away; and provides a combined structure which may be housed in a single container for storage and shipment.

An important object of the invention is to provide a fishing game in which the fish are of circular form and have means for varying the value given to each fish as it is caught or removed from the fish pool.

A further object of the invention is to provide a partition structure which when set up in interengaging fashion, will also engage the container receptacle to provide a fishing pool and also a landing station in which caught fish must be lodged in order to be counted.

A still further object of the invention is to provide a hook and engageable means therefor in connection with the fish so that a positive connection is not always made by the hook with the fish resulting in the escape of some fish from the hook.

A still further object of the invention is to provide a jointed fishing pole which together with the other parts may be lodged entirely in a container receptacle in which they fit closely, to provide a compact package for storage and shipment.

Other objects of the invention will appear in the specification and will be apparent from the accompanying drawings in which, Fig. 1 is a perspective view of a game in accordance with this invention set up ready for fishing operation.

Fig. 2 is a perspective view of the partitions which are fitted together for engagement with each other and with the upstanding sides of a box or receptacle forming therewith a fishing pool in a median portion of the receptacle with fish landing stations at opposite ends thereof.

Fig. 3 is a perspective view of several of the fish used in the game.

Fig. 4 is an enlarged sectional view of one of the fish showing the engagement of a hook therewith.

Fig. 5 is a side elevation of one of the fish with a variable counting indicator at the outside thereof.

Fig. 6 is an enlarged perspective view of one of the fish hooks.

Fig. 7 is a perspective view of a jointed fish pole used in the game; and

Fig. 8 is an enlarged perspective view of the joint in the fish pole.

Although fishing games of various kinds are well known, they usually include a hook and an eye engagement between the fish pole and any article representing the fish or the hook is in the form of a magnet which attracts a metal piece located on the fish.

The present invention not only provides a novel form of hook, but also a fish of distinct and different form, the fish being provided with means for increasing the value of each fish each time it is drawn out of a fish pool, and a fish pool which is readily made up from interengaging partitions which also interengage the opposite sides of a container for the game and thereby provide a novel form of pool for containing the fish and from which they may be drawn.

Referring now more particularly to the drawings, each fish comprises a hollow cylinder 10 of fiber, cardboard, and the like to which is applied a paper cover 12 which is somewhat longer than the cylinder 10 so that one end 14 projects beyond the end of the cylinder and is turned reversely into the cylinder at one end thereof.

The outside of the cover 12 is commonly decorated with pictures of fish of different kinds and in a band 16 about the bottom of the cylinder are numbers 17, 18 and 19 designating increasing values which may relate to the particular fish illustrated at the outside of the cover but which constitute a means for counting or evaluating the importance of any fish which is caught.

Extending through each fish or cylinder 10 is a cord or a rubberband 20 which also extends around the outside of the fish and preferably adheres thereto so that it may be located at one place about the cylinder with the outside portion adjacent one of the numbers 17, 18 or 19 to designate the value of the fish at the time it is caught. After being caught and returned to the fish pool, the position of the band 20 may be changed either to an increase value or a decrease value depending upon the adopted rules of the game. To attach an ordinary rubberband upon the cylinder, it must be cut and one end threaded through the cylinder and the cut ends then connected by a knot or tie 22 which may then be moved to the inside of the cylinder 10 where it is not noticed or objectionable and does not interfere with the fishing operation.

When the end 14 of a paper cover is inserted at one end of the cylinder 10, it is not ordinarily pasted to the cylinder, but the outer portion of the cover is usually adhesively connected to the outer side of the cylinder 10 so that it will remain firmly in place. This inward projection of the end 14 is sufficient to provide means for engaging a fish hook 24 which is preferably bent in the form of a T with an intermediate upright portion 26 which forms a hook to which a fish line 28 is attached and the opposite ends 30 thereof which are bent upon themselves to provide outwardly rounded extensions which are diametrically opposite to each other and both at right angles to the vertical portion 26. The dimensions of the bent ends 30 are such that they engage freely within a cylinder 10 into which they may be inserted by tipping or tilting the fish hook by means of the cord 28, but they also extend sufficiently to engage the inwardly bent end 14 of the paper cover at opposite sides thereof so that after such engagement, if the hook 26 is raised by the fish line 28, the fish consisting of the cylinder 10 and its cover are raised thereby. Each hook line 28 is secured at the end of a fish pole which is here shown to consist of a pair of dowels 32 inserted in a cylindrical connector 34 and held therein by frictional engagement. By making a pole in this manner, it is easily set up or taken apart and may be included in a box or container of smaller dimensions. It is also contemplated that three or even more sections may be provided for the pole if desired.

A box-like receptacle 36 is provided for mounting the game which consists of upright sides 38 and connecting ends 40 and for which a similar top (not shown) of slightly larger dimensions is provided which slips tightly over the outside of the receptacle. The length of the dowels 32 is such that they may be included cross wise in the receptacle when the fish poles are taken apart.

Two sets of similar plates 42 and 44 are provided which are of about the same length and slightly longer than the width of the receptacle 36. In one set 42 are slots 46 near the ends thereof and relatively extending from the upper edge half-way downward through the plates and of a width to freely receive the other plates 44 therethrough. Likewise the other plates 44 have slots 48 extending from the lower edges thereof substantially to the center and of a width to embrace about double the thickness of the other plates 42. These four plates may be assembled together in rectangular form by the interengagement of the slots 46 and 48 thereof and because of the wider slots 48, this rectangular structure may be set over the opposite edges 38 of the container 36 to also interengage therewith. By locating these interengaging plates intermediate the ends of the container which is longer than its width, the interior of the plates forms a fishing pool 50 for receiving a plurality of the fish 10 which are less in height than the height of the plates 42 and 44 and with the inwardly turned ends 14 of the covers 12 at the top thereof.

This arrangement also forms open ends 52 in the container 36 into which opposite players may be required to register the fish which he has caught from the pool 50 before it can be counted. In other words, if the fish falls off before it is lodged in the open end 52, that is one fish which got away and it may be returned to the pool with its effective value either raised or lowered depending upon the rules of the game.

With this construction, the pool formed by the plates 42 and 44 may be shifted at right angles or oppositely to the first position and the different plates may have a designation 54 for game No. 1, game No. 2, and the like, or it may have a designation 56 for first trip, second trip, and the like, thus indicating different positions of the players or different conditions of the game as desired.

With this construction, a variety of games may be played and fishing may be carried on in different manners depending upon the rules of the game, the hooks 24 being inserted into the fish 10 and the fish then removed by lifting them from the pool formed by the plates 42 and 44. It may be required for each player to land the fish which he has caught into one of the open ends 52 in order to qualify him for the rated value of the fish and if one of the fish is lost, either in the pool or out of the receptacle 36 before it is lodged in the open end 52, that is a fish which got away and may be counted against the player or fish may be returned to the pool with a different value set up on the fish by moving the band 20. A number of different requirements or provisions may be made for controlling the game or different games which may be played with the same equipment by varying the position of the plates 42 and 44 and by shifting the positions of the players and varying the values of the fish as above set forth.

While I have described a preferred embodiment of my invention, in some detail, it should be regarded as an illustration or an example rather than as a limitation or restriction of the invention, since various changes in the construction, combination, and arrangement of the parts may be made without departing from the spirit and scope of the invention.

I claim:

1. A fishing game comprising a receptacle therefor having upstanding sides, a plurality of pairs of plates to fit in the receptacle and having interengaging slots extending from relatively opposite edges and the plates being of a length greater than the width of the receptacle to fit transversely over the receptacle with the slots of one pair of plates engaging the opposite sides of the receptacle and the other pair of plates engaging the first pair and positioned at right angles thereto to form a rectangular fishing pool with the receptacle, fish comprising hollow cylindrical tubes adapted to be set upon end within the pool made by the plates and having engaging means at the upper ends within the tubes, and fish poles having hook means supported by fish lines from the poles and adapted to be inserted within the open upper ends of the tubes and to engage releasably with said means at the upper ends of the tubes, the fish formed by the tubes having a paper cover tucked inwardly at the upper end which forms an inner projection engageable by the hook means.

2. A fishing game in accordance with claim 1, in which the hook means comprises a central support with oppositely extending ends adapted to be tilted for insertion in the open end of a cylindrical tube and to engage under the inwardly projecting paper ends of the tubes for withdrawing them from the fishing pool.

3. A fishing game in accordance with claim 2, in which said hook comprises a wire with a vertical loop portion to which the fish line is connected, and ends bent upon themselves at right angles to the lower end of the vertical portion and with looped extremities at the bent ends.

4. A fishing game in accordance with claim 3, in which the pole to which each fish line is attached is a jointed pole, said pole comprising a plurality of dowels, and a cylindrical connector into which each pair of adjacent ends of the dowels are inserted.

5. A fishing game in accordance with claim 1, in which the tubes are provided on the outside with a series of numbers representing values extending around the outside of the tube, and movable means connected to the tube for designating which value is applicable to the tube at that time.

6. A fishing game in accordance with claim 5, in which the movable means is a rubberband extending around the inside and outside of the cylinder and adhering thereto so that it will remain at any location designated by one of the numbers at the outside of the tube.

References Cited in the file of this patent

UNITED STATES PATENTS

| 450,395 | Boynton | Apr. 14, 1891 |
| 464,391 | Samuels | Dec. 1, 1891 |
| 723,120 | Adams | Mar. 17, 1903 |

FOREIGN PATENTS

| 399,442 | Great Britain | Oct. 5, 1933 |